(12) United States Patent  (10) Patent No.: US 7,900,406 B2
Wobben  (45) Date of Patent: Mar. 8, 2011

(54) FOUNDATION APPARATUS FOR A WIND TURBINE TOWER

(76) Inventor: Aloys Wobben, Aurich (DE)

( * ) Notice: Subject to any disclaimer, the term of this patent is extended or adjusted under 35 U.S.C. 154(b) by 0 days.

(21) Appl. No.: 12/479,654

(22) Filed: Jun. 5, 2009

(65) Prior Publication Data

US 2009/0235597 A1  Sep. 24, 2009

Related U.S. Application Data

(63) Continuation of application No. 10/492,103, filed as application No. PCT/EP02/10673 on Sep. 24, 2002, now Pat. No. 7,614,200.

(30) Foreign Application Priority Data

Oct. 9, 2001 (DE) .................... 101 49 669
Jan. 11, 2002 (DE) .................... 102 00 728
Jun. 18, 2002 (DE) .................... 102 26 996

(51) Int. Cl.
E04B 1/00 (2006.01)
E02D 27/32 (2006.01)
E04G 1/22 (2006.01)

(52) U.S. Cl. ......... 52/126.1; 52/296; 52/40; 416/DIG. 6; 248/156

(58) Field of Classification Search .............. 52/115, 52/126.1, 170, 292, 296, 297, 40, 169.9, 52/169.13, 632, 741.15, 745.17, 745.2; 416/DIG. 6; 174/45 R; 248/156, 530; 343/874, 875
See application file for complete search history.

(56) References Cited

U.S. PATENT DOCUMENTS

| 731,177 | A | * | 6/1903 | Gray | 52/651.08 |
| 833,791 | A | * | 10/1906 | Moran | 405/249 |
| 1,529,895 | A | * | 3/1925 | La Chance et al. | 52/223.5 |
| 2,625,815 | A | * | 1/1953 | Black | 52/126.1 |
| 2,630,075 | A | * | 3/1953 | Omsted | 104/125 |
| 2,730,797 | A | * | 1/1956 | Lipski | 29/452 |
| 3,521,413 | A | * | 7/1970 | Scott et al. | 52/98 |
| 3,556,196 | A | * | 1/1971 | Buhler et al. | 164/38 |
| 3,837,752 | A | | 9/1974 | Shewchuk | |
| 4,064,668 | A | | 12/1977 | Carter | |
| 4,099,354 | A | | 7/1978 | DePirro | |
| 4,218,858 | A | | 8/1980 | Legler | |
| 4,221,363 | A | | 9/1980 | Jasper | |
| 4,272,929 | A | | 6/1981 | Hanson | |
| 4,426,758 | A | | 1/1984 | Castoe | |
| 4,899,497 | A | * | 2/1990 | Madl, Jr. | 52/126.6 |
| 4,930,270 | A | | 6/1990 | Bevacqua | |

(Continued)

FOREIGN PATENT DOCUMENTS

DE  546447  3/1932

(Continued)

*Primary Examiner* — Robert J Canfield
*Assistant Examiner* — Brent W Herring
(74) *Attorney, Agent, or Firm* — Seed Intellectual Property Law Group PLLC

(57) ABSTRACT

A foundation for a structure comprises a plurality of segments. To build the foundation, a foundation bed is excavated, and a stable, substantially level and horizontal subbase is built in the foundation bed. A foundation segment of the structure is set down on the subbase, such that at least three vertically adjustable support poles fixedly attached to the foundation segment contact reinforced points of support on the subbase. A remainder of the foundation bed is then filled with foundation mass to a level above a bottom rim of the foundation segment.

8 Claims, 12 Drawing Sheets

U.S. PATENT DOCUMENTS

| | | | |
|---|---|---|---|
| 5,242,147 A * | 9/1993 | Kemeny | 248/638 |
| 5,344,253 A | 9/1994 | Sacchetti | |
| 5,359,821 A * | 11/1994 | Merriman | 52/169.9 |
| 5,505,033 A | 4/1996 | Matsuo et al. | |
| 5,533,835 A | 7/1996 | Angelette | |
| 5,595,366 A | 1/1997 | Cusimano et al. | |
| 5,611,176 A | 3/1997 | Juengert et al. | |
| 5,664,377 A | 9/1997 | Angelo et al. | |
| 5,749,189 A | 5/1998 | Oberg | |
| 5,819,487 A | 10/1998 | Bull et al. | |
| 6,038,823 A * | 3/2000 | Gallimore et al. | 52/126.1 |
| 6,042,074 A | 3/2000 | Cusimano | |
| 6,049,378 A | 4/2000 | Busch et al. | |
| 6,079,179 A | 6/2000 | Shoemaker, Jr. | |
| 6,192,649 B1 | 2/2001 | Karim-Panahi et al. | |
| 6,256,940 B1 * | 7/2001 | MacKarvich | 52/126.6 |
| 6,289,950 B1 | 9/2001 | Chiang | |
| 6,299,137 B1 * | 10/2001 | Bainter | 254/89 H |
| 6,351,250 B1 | 2/2002 | Gillen | |
| 6,467,231 B1 | 10/2002 | Carlinsky et al. | |
| 6,503,024 B2 | 1/2003 | Rupiper | |
| 6,606,798 B2 | 8/2003 | El-Katcha et al. | |
| 6,739,568 B2 * | 5/2004 | Whittaker et al. | 248/638 |
| 6,874,739 B1 | 4/2005 | Gregory | |
| 7,293,960 B2 | 11/2007 | Yamamoto et al. | |
| 2002/0140621 A1 * | 10/2002 | Harrison | 343/890 |
| 2003/0000165 A1 | 1/2003 | Tadros et al. | |
| 2003/0033760 A1 * | 2/2003 | Rogers et al. | 52/167.7 |
| 2003/0051420 A1 | 3/2003 | Leon | |
| 2004/0131428 A1 * | 7/2004 | Henderson | 405/233 |
| 2004/0194402 A1 | 10/2004 | Payne | |
| 2004/0261333 A1 * | 12/2004 | Whittaker | 52/167.1 |
| 2009/0031639 A1 | 2/2009 | Cortina/Cordero | |

FOREIGN PATENT DOCUMENTS

| | | |
|---|---|---|
| DE | 1255992 | 12/1967 |
| DE | 6606861 U | 12/1970 |
| DE | 3306182 A1 | 8/1984 |
| DE | 4315286 C2 | 11/1994 |
| EP | 0313486 A1 | 4/1989 |
| GB | 2443181 A | 4/2008 |
| JP | 6173435 A | 6/1994 |
| JP | 6316942 A | 11/1994 |
| JP | 10317391 A | 12/1998 |
| JP | 200283019 A | 10/2000 |

* cited by examiner

FOUNDATION APPARATUS FOR A WIND TURBINE TOWER

CROSS-REFERENCES TO RELATED APPLICATIONS

This application is a continuation of U.S. patent application Ser. No. 10/492,103, filed Oct. 18, 2004, now pending, which is a 371 of PCT/EP2002/010673, filed Sep. 24, 2002, which claims priority to DE 102 26 996.3 filed Jun. 18, 2002, DE 102 00 728.4, filed Jan. 11, 2002, and DE 101 49 669.9, filed Oct. 9, 2001. Each of these applications is incorporated herein by reference in its entirety.

BACKGROUND OF THE INVENTION

1. Field of the Invention

The invention relates to a method for building a foundation for a structure comprising a plurality of segments, in particular for a wind turbine tower. The invention also relates to a support pole, a foundation segment for such a structure and a wind turbine.

2. Description of the Related Art

Constructing a permanently stable and level foundation is of enormous importance for larger structures. Particularly in the case of a wind turbine tower, which can be more than 100 m in height and be exposed in operation to enormous forces, the foundation must conform to exacting specifications.

Wind turbine foundations are currently constructed by firstly making a so-called subbase in a foundation bed, in other words a cement or concrete base layer that is as level and horizontal as possible. Support poles for setting down the foundation segment on the subbase are then mounted on the foundation segment, i.e., the lowermost segment of a tower comprised of several segments. In order to compensate for any unevenness in the subbase and to align the foundation segment as horizontally as possible, the support poles can be screwed varying depths into the underside of the foundation segment, the support poles being configured for this purpose as threaded poles in at least the upper section facing the underside of the foundation segment.

There have been cases in which support poles have either penetrated into the subbase or broken off from the underside of the foundation segment as a result of the enormous lateral loads exerted on the support poles by the foundation segment, which can currently weigh between 10 and 14 metric tonnes. This has resulted in the foundation segment overturning. In addition to the dangers to which persons engaged in constructing the foundation were exposed, this has led not only to delays but also to additional costs for remedying the damage caused.

BRIEF SUMMARY OF THE INVENTION

One object of the invention is therefore to provide a method for building a foundation for a structure comprising a plurality of segments, in particular, for a wind turbine tower; an improved support pole; a suitable foundation segment and a wind turbine in which the aforementioned problems are avoided.

This object is accomplished pursuant to the invention by a method comprising the following steps:

a) excavating a foundation bed,
b) building a stable, substantially level and horizontal subbase in a foundation bed,
c) setting down a foundation segment of the structure onto the subbase, wherein at least three vertically adjustable support poles are fixedly attached to said foundation segment by means of a supporting bracket mounted at the end of the support poles in such a way that only the support poles are placed onto predetermined points of support on the subbase,
d) producing a reinforcement on the subbase,
e) filling the remainder of the foundation bed with foundation mass, in particular concrete, to a level above the bottom rim of the foundation segment.

The invention is based on the realization that the problems occurring with methods to date can be avoided if the support poles are not screwed directly into the underside of the foundation segment, but instead are fixedly attached to distributed points on the foundation segment by means of supporting brackets, e.g., in the form of a support plate, before the foundation segment is set down on the subbase. The vertical adjustment means are still provided on the support poles, but elsewhere than hitherto, and the height of the segment is adjusted by screwing the support poles by different amounts into the underside of the foundation segment. The supporting brackets provide the foundation segment with a significantly larger supporting surface on the support poles, and hence a significantly improved distribution of load. This means that buckling of a threaded pole at the underside of the foundation segment will no longer occur.

In order to prevent the support pole from penetrating the subbase, the invention also provides for reinforcement of those points where the support poles bearing the foundation segment are set down on the subbase. These points may be reinforced over a larger area by installing (additional) reinforcement mats and/or by providing local reinforcement, for example by making the subbase higher at predefined positions. An alternative or additional means is to use base plates. These can be laid at predefined positions on the subbase so that the support poles can be set down on them, or they are mounted on the support pole at the opposite end from the supporting bracket.

After the foundation segment with the support poles has been set down on these points of support or base plates and been vertically adjusted to compensate for differences in height, the rest of the foundation bed is filled with foundation mass, for example with concrete, in one or more filling steps, the foundation mass being poured in until it reaches a level that is above the lower rim of the foundation segment, thus achieving a stable foundation. Owing to this stable support for the foundation segment, problems that are known to occur during this final casting process when prior art methods are used, particularly changes in the position of the foundation segment when it is being filled with foundation mass, no longer occur.

In one preferred configuration, the support poles are each attached by means of support plates to a flange mounted on the underside of the foundation. The support plates are preferably bolted to the flange. This enables particularly good positioning and support of the foundation segment on the support poles to be achieved.

In an alternative configuration, the support poles are each attached to a flange around the upper rim of the foundation segment. To this end, it is preferred that the supporting bracket at the upper end of the support pole be configured in such a way that it can be firmly attached to the flange, for example by bolting together the flange and the bracket. To ensure that the foundation segment is securely supported, it is also preferred in such a configuration that the support poles pass through eyes attached to the lower rim of the foundation segment and extend inside the foundation segment.

In the final step of the method, the foundation bed can be filled with foundation mass in a single casting. In a preferred version, particularly when the support poles are configured as just described, the rest of the foundation bed can also be filled in two steps. In a first step, the foundation bed is filled with foundation mass to a level approximately equal to that of the lower rim of the foundation segment. Any vertical alignment of the foundation segment that is necessary can then be carried out in order to compensate for any shifts in the position of the foundation segment during the first casting step, and a position achieved that is as horizontal as possible. To this end, the support poles have the vertical adjustment means in a section that of course has not yet been filled with foundation mass at this time. Finally, once the foundation segment has been vertically aligned, the rest of the foundation bed can then be filled until the desired level of foundation mass is reached.

In another configuration according to the invention, the rest of the foundation bed is filled with foundation mass to such a height that holes provided in the side walls of the foundation segment are covered, the foundation mass being poured into the hollow interior of the foundation segment as well.

In a preferred embodiment, a row of holes is provided around the circumference of the foundation segment and equidistant from the underside of the foundation segment. Reinforcement wires are braided through said holes to form a mechanical connection between the foundation and the foundation section.

In other words, the foundation mass is poured into the foundation bed not only in the area around the foundation segment, but also into the interior of the hollow foundation segment, in order that said foundation segment is not exposed to lateral forces resulting from the foundation mass being poured into the outer area, which could lead in turn to the foundation segment changing its position when the foundation mass is being poured. Due to the fact that foundation mass is also poured into the interior of the foundation segment, the latter is stabilized in its position and cannot be tilted or changed in its position by foundation mass poured into the outer area.

It is preferred that the vertical adjustment for the support poles be provided on the lower end of the support poles facing the subbase. This could be accomplished with an adjuster nut, for example. Preferably, the support pole itself has an internal threaded rod for performing such vertical adjustment.

In one advantageous configuration of the method according to the invention, there is a means for measuring the current vertical adjustment of the separate supporting brackets. This is preferably achieved with optical measurement means, such as a measurement means that transmits a focused laser beam in a horizontal direction, with matching sensors mounted on the supporting brackets. Said sensors generate a sensor signal containing information about the current height of the supporting bracket, thus permitting vertical adjustment so that the foundation segment is horizontally aligned. Furthermore, controlled drive means for vertical adjustment of the supporting brackets can also be provided that automatically adjust the height of the supporting brackets in response to the sensor signals that are detected.

The invention also relates to a wind turbine with a tower comprising a plurality of segments, the lowermost segment being a foundation segment of the kind described and the foundation of the tower being made by the method described.

BRIEF DESCRIPTION OF THE SEVERAL VIEWS OF THE DRAWINGS

The invention shall now be explained in greater detail with reference to the drawings. These show.

DETAILED DESCRIPTION OF THE INVENTION

Figure 1:
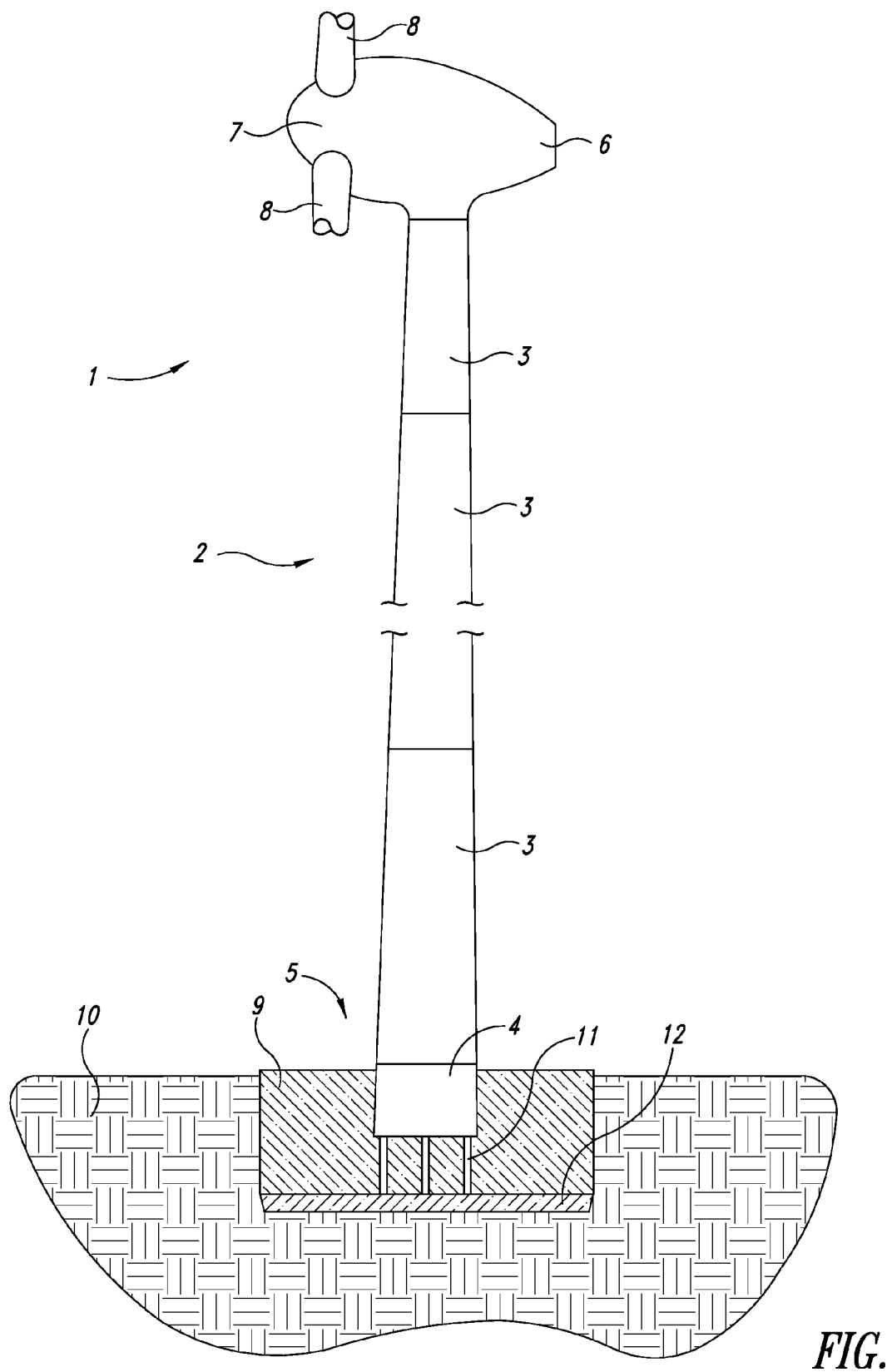
FIG. 1 shows a wind turbine according to the invention, with a tower comprised of a plurality of segments.

The wind turbine 1 shown schematically in FIG. 1 has a tower 2 comprising a plurality of segments 3, wherein the lowermost segment 4, the so-called foundation segment, is embedded in a foundation 5. A nacelle 6 is rotatably mounted at the top of the tower 2, and a rotor 7 with a plurality of blades 8 is attached to said nacelle. Disposed inside nacelle 6 is an electrical generator that is made to rotate by the wind forces acting on the rotor blades 8, thus generating electrical energy.

The segments 3, including foundation segment 4 of tower 2, are preferably steel elements, but generally can also be prestressed concrete elements into which prestressing steel elements or braces, for example, are cast. Foundation segment 4 is cast into a foundation block 9 that preferably consists of concrete. Said foundation block 9 may extend above the surrounding ground 10 or end level with the ground, but in any case covers the lower rim of the foundation segment 4 as well as the support poles 11 attached to the underside of said foundation segment 4. By means of said support poles 11, the foundation segment is propped on a subbase 12, which is a cement or concrete bed made as level and horizontal as possible and cast in the foundation bed before foundation segment 4 with support poles 11 is erected.

Figure 2:
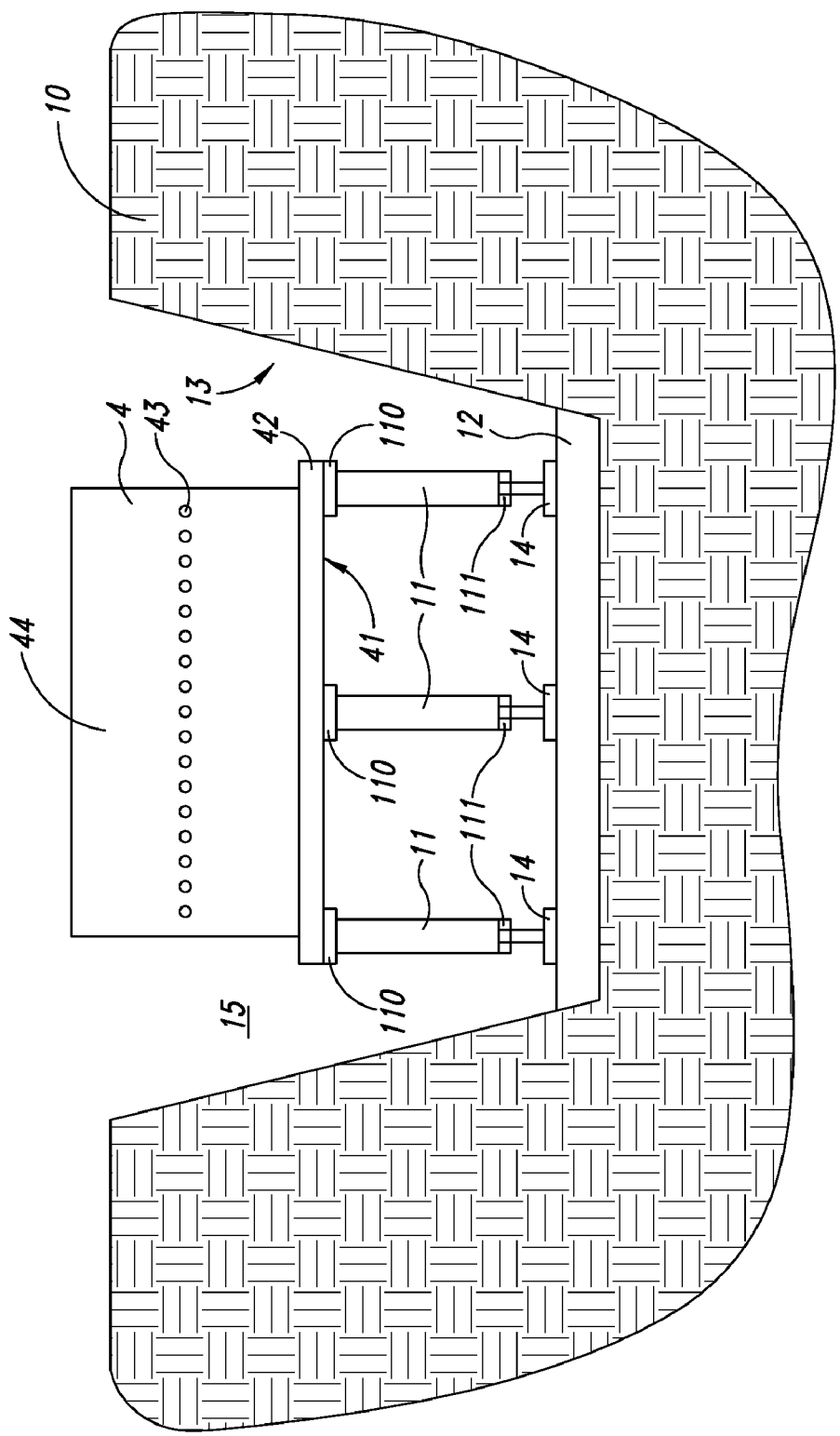
FIG. 2 shows a first configuration of a foundation segment according to the invention.

FIG. 2 shows the main element of foundation 5 prior to casting of the foundation mass to form foundation block 9. To make the foundation, a foundation bed 13 is excavated from the ground 10. A subbase 12, the upper surface of which should be as level and horizontal as possible, is then made on the floor of the foundation bed. Before foundation segment 4 is placed on subbase 12, three support poles 11 are first attached fixedly to the underside 41 of foundation segment 4. In order to achieve maximum uniformity of load distribution and optimal support of the foundation segment on the support poles 11, said support poles each have a support plate 110 fixedly attached as a support to the upper end facing the underside of foundation segment 4, by means of which the support poles 11 are attached, preferably tightly bolted, to a flange 42 of the foundation segment. Support poles 11 are also uniformly spaced apart or arranged at predefined positions around the circumference of the cylindrical foundation segment 4. Before foundation segment 4 is set down, points of support 14 are marked on subbase 12 and reinforced with base plates in order to prevent the support poles 11 from penetrating the subbase 12. Once foundation segment 4 has been set down on base plates 14, it can be adjusted in height by means of support poles 11 so that foundation segment 4 is as horizontal as possible. For this purpose, support poles 11 have vertical adjustment means 111 that may be configured as an internal threaded rod with an adjuster nut.

After foundation segment 4 has been vertically adjusted, it is then reinforced. This is done by braiding reinforcement wires through the holes in the row of holes 43 provided in the side walls of foundation segment 4. In a final step, foundation bed 13 is completely filled with foundation mass, preferably concrete. The foundation mass is poured not only into the outer cavity of foundation segment 4 but also into the interior space 44 of foundation segment 4, to ensure that the position of the foundation segment is not changed, for example as a result of lateral forces exerted externally on the foundation segment by the foundation mass when it is being poured. Owing to the fact that foundation reinforcement wires are fed through the holes in the row of holes 43, tensile forces can also be safely conducted from the tower into the foundation. Once foundation segment 4 has been firmly encast, the remainder of the tower can be assembled.

Figure 3:
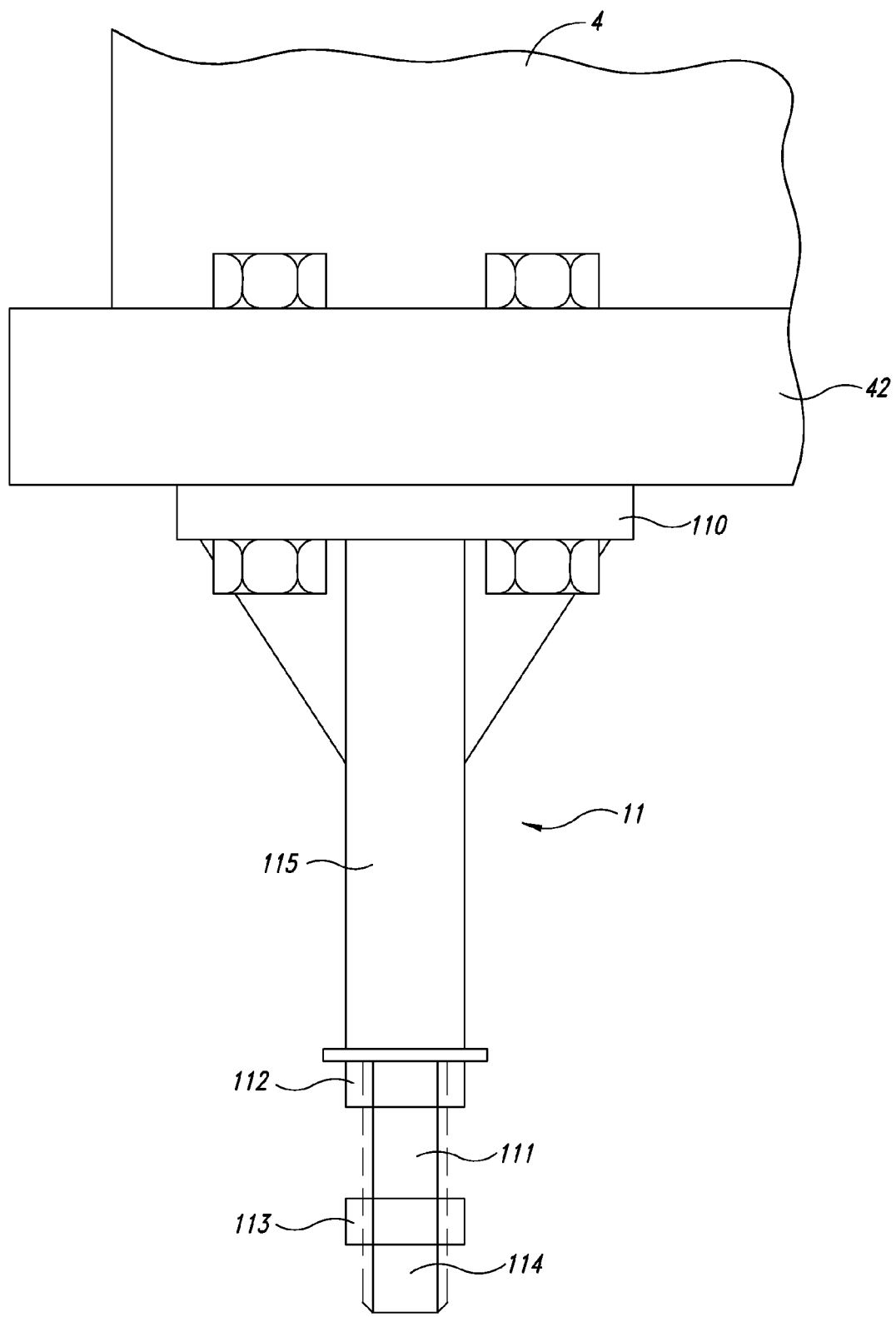
FIG. 3 shows a section of the inventive foundation segment in FIG. 2, with a support pole.

FIG. 3 shows a more detailed section of foundation segment 4 with a support pole 11. It can be seen how support pole 11 is bolted to flange 42 of foundation segment 4 by means of support plate 110 fixedly attached to support pole 11. In at least the lower portion of support pole 11, an internal threaded rod 114 is provided to which an adjuster nut 112 is fitted in order to adjust the height, i.e., to change the length of support pole 11. Adjuster nut 112 supports itself against the outer jacket of support pole 11, thus permitting lengthwise adjustment of the threaded rod 114. The fixed nut 113 enables the threaded pole 114 to be securely held such that it cannot turn at the same time as nut 112 is turned.

Figure 4:
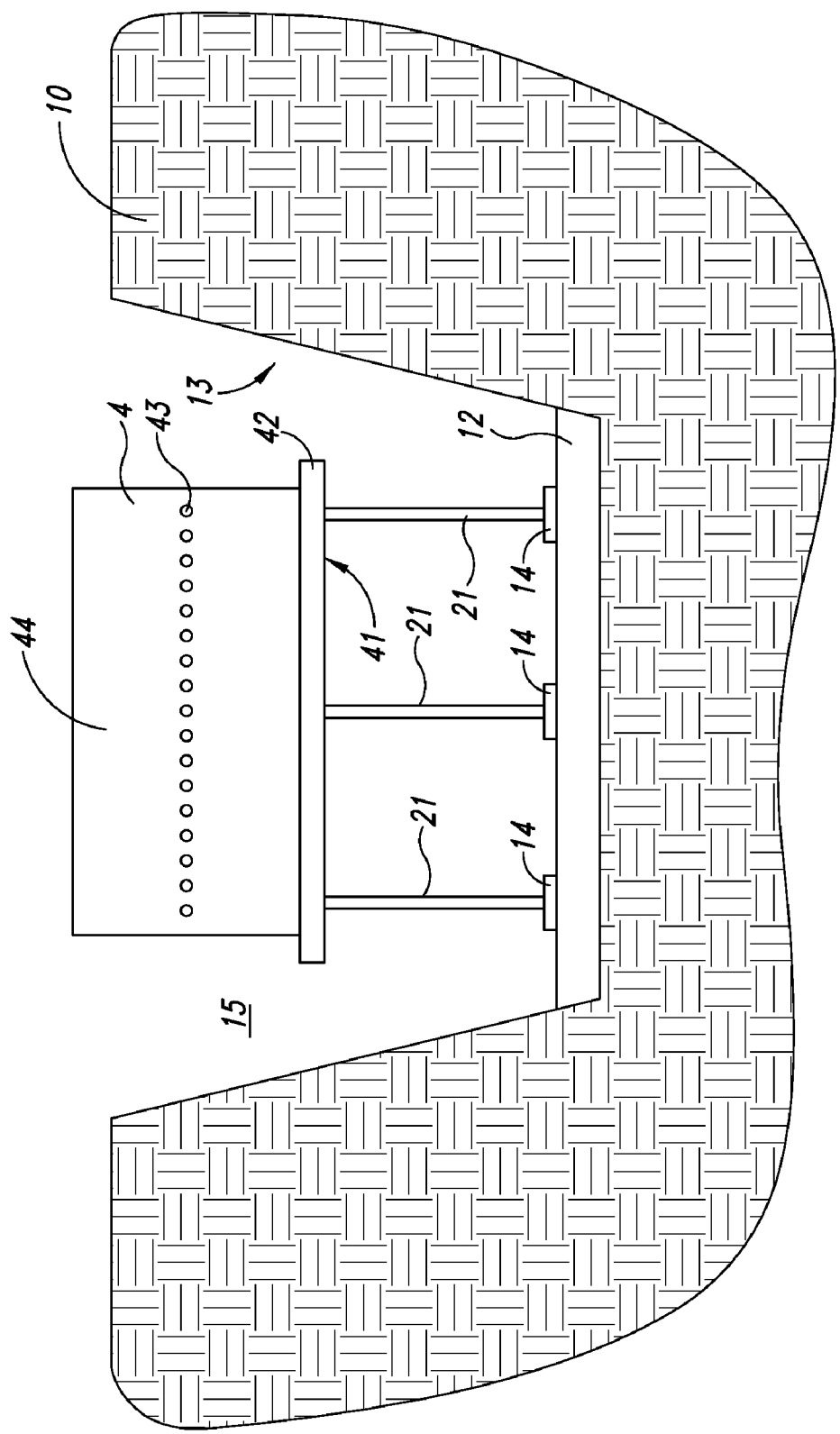
FIG. 4 shows a second configuration of a foundation segment according to the invention.

FIG. 4 shows an alternative configuration of a foundation segment according to the invention, in which other support poles 21 are used. What is shown is again foundation segment 4 supported on three support poles 21. Between the subbase 12 and the support poles 21, support plates 14 for distributing the weight are provided in order to prevent the support poles 21 from penetrating the subbase 12.

Figure 5:
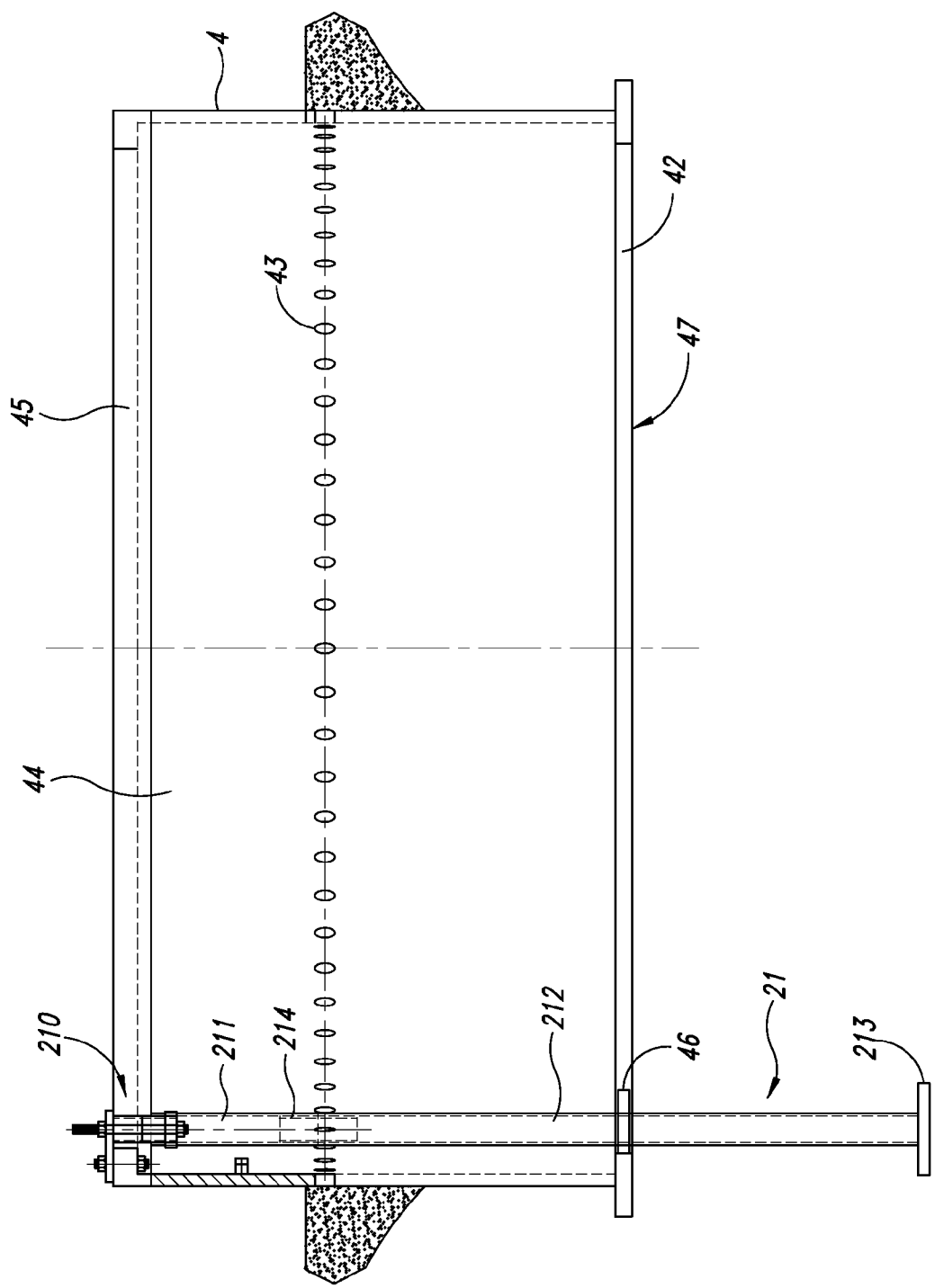
FIG. 5 shows a cross-section of the foundation segment in FIG. 4, with a support pole.

In this particular configuration, the support poles 21 extend inside the interior 44 of foundation segment 4 as far as its upper rim, as can be clearly seen in FIG. 5. The latter Figure shows a foundation segment 4 with a single support pole 21 in cross-section. The support pole 21 is comprised of several parts and has a supporting bracket 210, a middle section 211 and an end member 212 with a base plate 213. Supporting leg 210 is for attaching support pole 21 to the upper flange 45 of foundation segment 4. The middle section 211 is attached to the supporting bracket 210, on the one hand, and also to end member 212, for example by screwing it into end member 212 by means of a threaded portion in a transition section 214. Transition section 214 is positioned above the row of holes 43 at a height where it is not covered with foundation mass after the foundation bed has been completely filled. Only the end member 212 of each support pole 21 is covered by the foundation mass, whereas the middle section 211 and the supporting bracket 210 can each be re-used.

Figure 6:
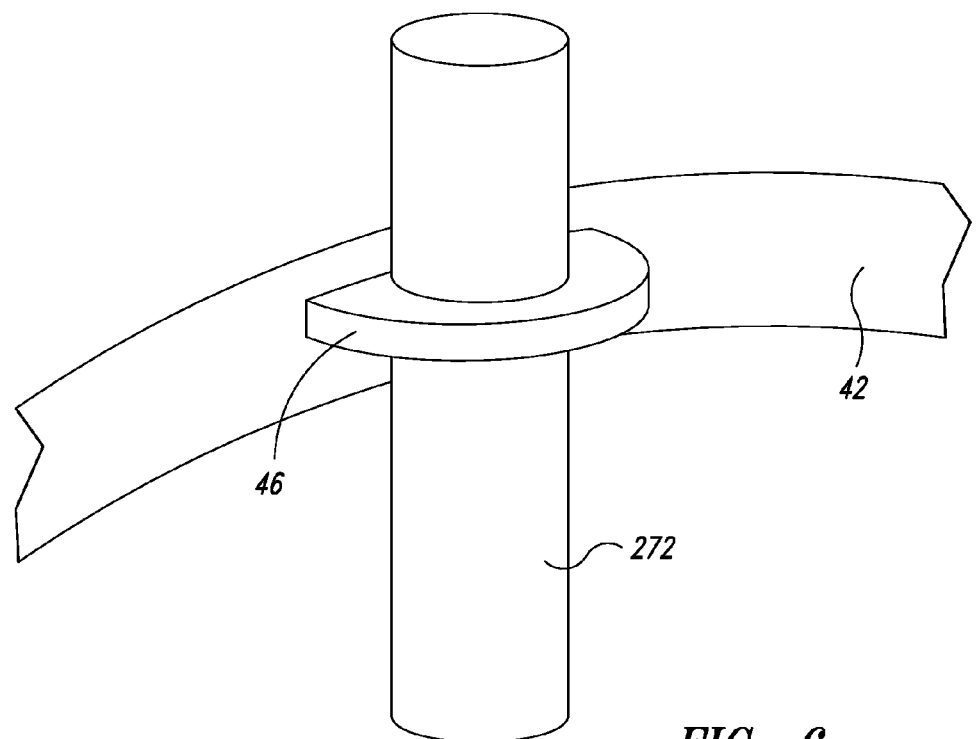
FIG. 6 shows a section of the inventive foundation segment in FIG. 5.

To provide better support for the foundation segment, support pole 21 is passed through an eye 46 attached to the lower flange 42, as can be seen in detail in FIG. 6.

Figure 7:
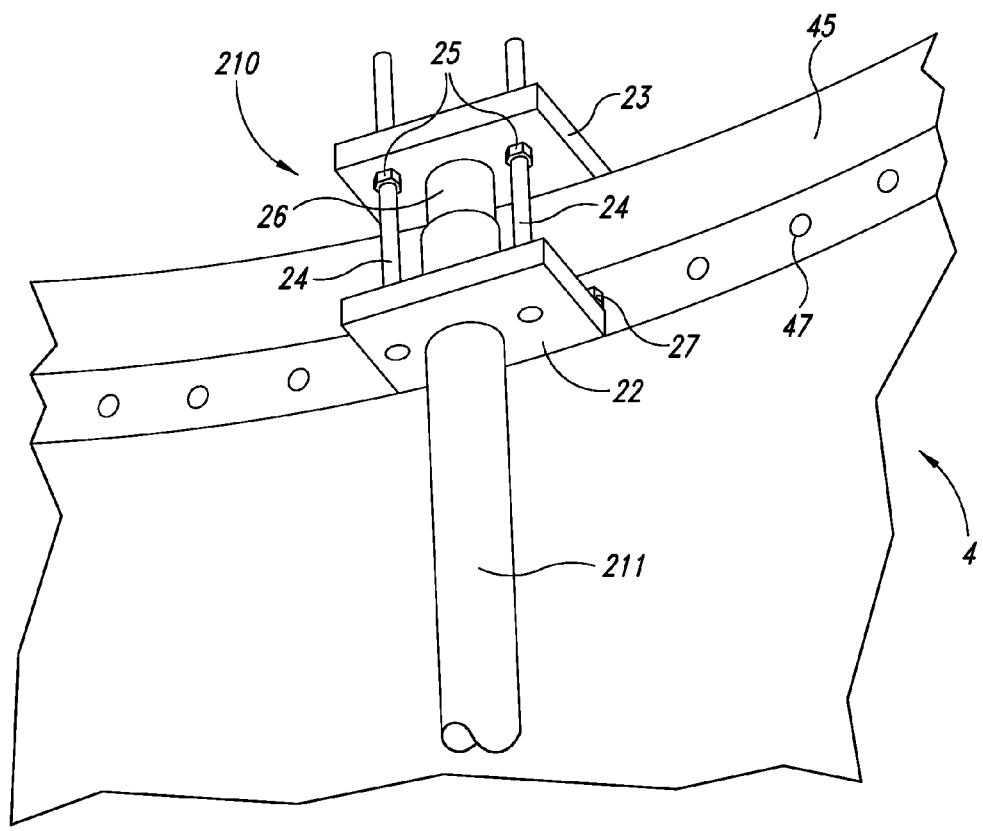
FIG. 7 shows a further section of the inventive foundation segment in FIG. 5.

FIG. 7 shows the upper portion of the support pole, i.e., part of the middle section 211 and the supporting bracket 210. Supporting leg 210 comprises several parts for attaching the support pole 21 to the upper flange 45 of foundation segment 4 and for adjusting or aligning the height of the foundation segment when making the foundation. Plates 22, 23 are located above and below the circumferential flange 45. The lower plate 22 partially conceals a screw 27 that grips through the pattern of holes 47 in the upper flange 45 and attaches the upper plate 23 of the supporting bracket 210 to foundation segment 4. Inside foundation segment 4, there are also two threaded poles 24 running between the two plates 22, 23, said threaded poles permitting the position of the upper plate 23 to be adjusted relative to the rest of supporting bracket 210 by means of nuts 25. A rod 26 attached to the upper plate 23 slides inside the middle section 211, the latter serving as an outer pipe. Since foundation segment 4 is connected to upper plate 23, any change in the position of upper plate 23 also causes the entire foundation segment 4 to move relative to the subbase 12.

Figure 8:
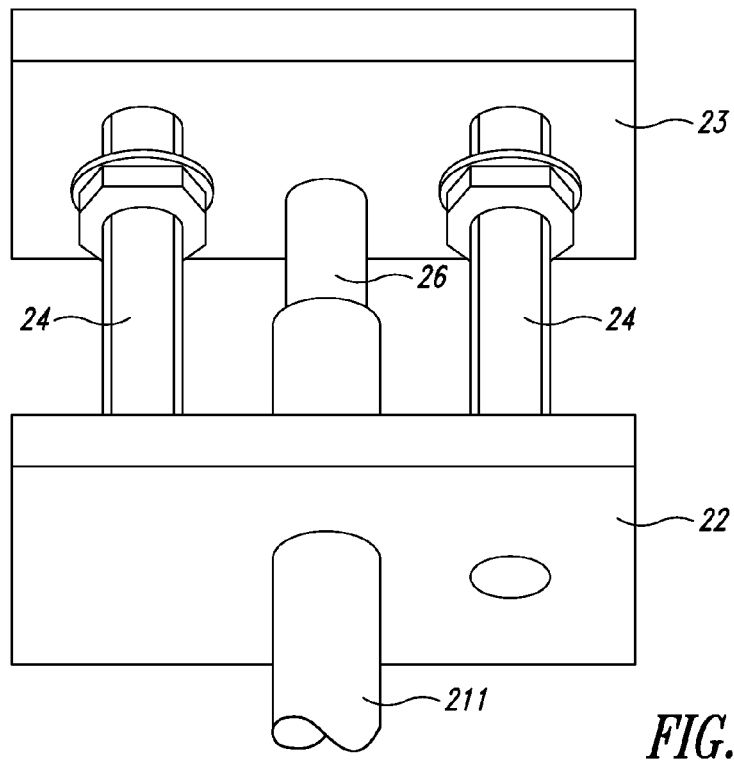
FIG. 8 shows a supporting bracket of a support pole shown in FIG. 5.

The upper plate 23 can be adjusted, by raising the foundation segment 4 with suitable lifting equipment, for example, such as a crane. Nuts 25 visible underneath the upper plate 23 (see also FIG. 8) can thus be adjusted until the desired position is reached. After such adjustment, foundation segment 4 can be lowered again until it is located in the desired position. This makes it easy to vertically adjust or align the foundation segment when the foundation is being constructed.

Figures 9, 10:
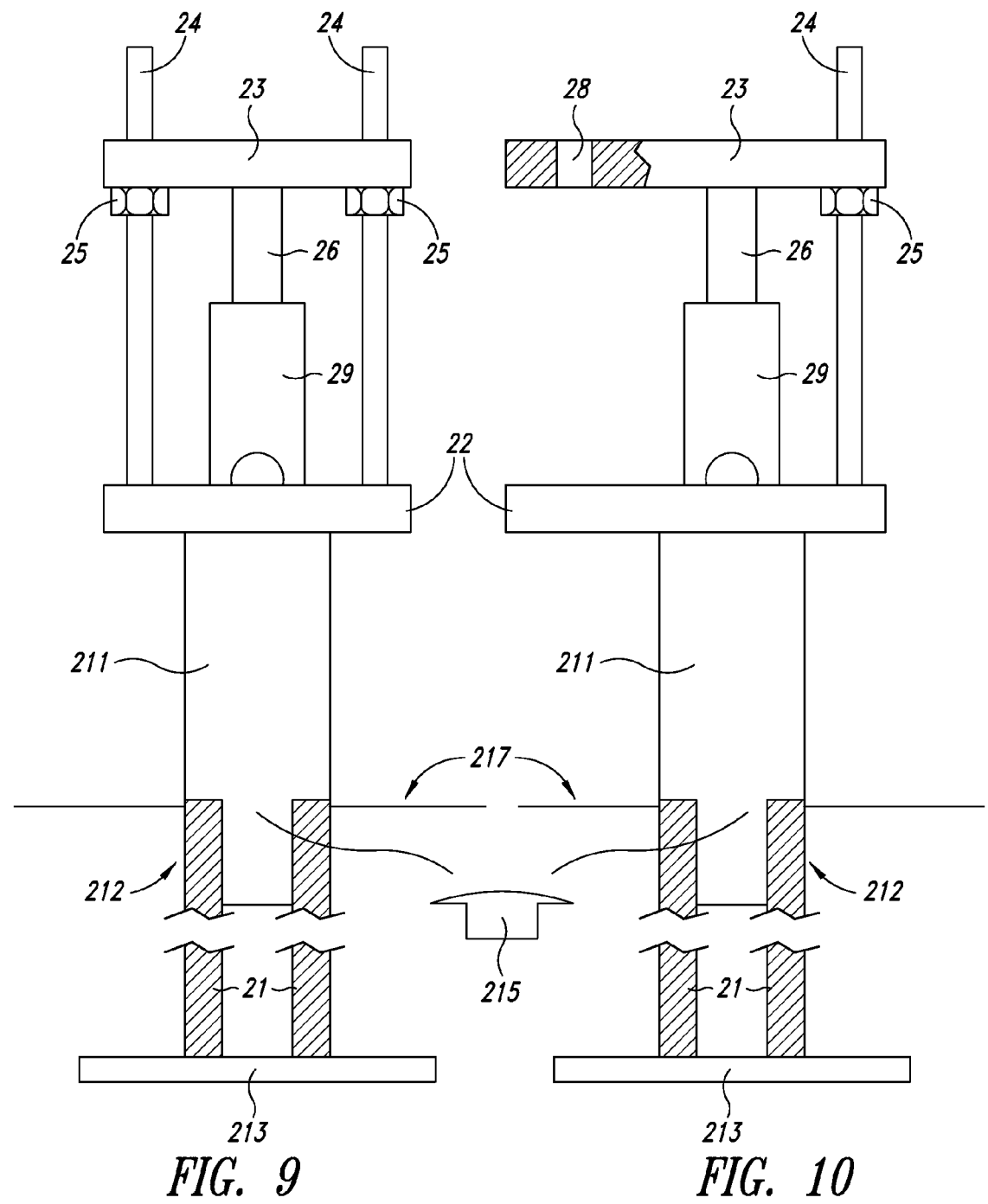
FIG. 9 shows a front view of a further configuration of a support pole according to the invention.
FIG. 10 shows a side elevation view of the support pole in FIG. 9.

Another configuration of a support pole according to the invention is shown in a front view and a side elevation view in FIGS. 9 and 10, respectively. The end member 212, as shown in FIG. 5, is again passed through an eye on the lower rim of the foundation section. What is also unchanged is that said end member is encast inside the foundation and is not used again. The foundation is filled to a height indicated in said Figures by line 217. In order to prevent moisture penetration, caps 215 are provided that can be used, after removing the re-usable part of the support pole from the end member 212, to cover what are then open ends.

The upper portion of said support pole is also largely identical to the support pole previously described. There are two plates 22, 23 between which threaded poles 24 with nuts are disposed. In the front view in FIG. 9, two threaded poles 24 with nuts 25 can be seen; in the side elevation view in FIG. 10, these are aligned one behind the other, which is why only one threaded pole 24 with nut 25 can be identified. In FIG. 10, a part of the upper plate 23 is broken open to show a through hole 28. Plate 23 and hence the support pole can be connected to the upper flange of the foundation segment through said through hole 28.

To simplify vertical adjustment and further reduce the proportion of manual work, an arrangement comprising a telescopic cylinder 29 and a telescopic pole 26 is provided between the two plates 22, 23. Said cylinder can be operated pneumatically or hydraulically, for example, and thus permit easy adjustment of the foundation section joined to the support pole. In this embodiment, threaded pole 24 and nut 25 serve, on the one hand, to fixate the position that is initially set by hydraulic or pneumatic means, and on the other hand as an "emergency actuation" means for manually adjusting the foundation section in the event that the hydraulic or pneumatic system fails.

Figure 11:
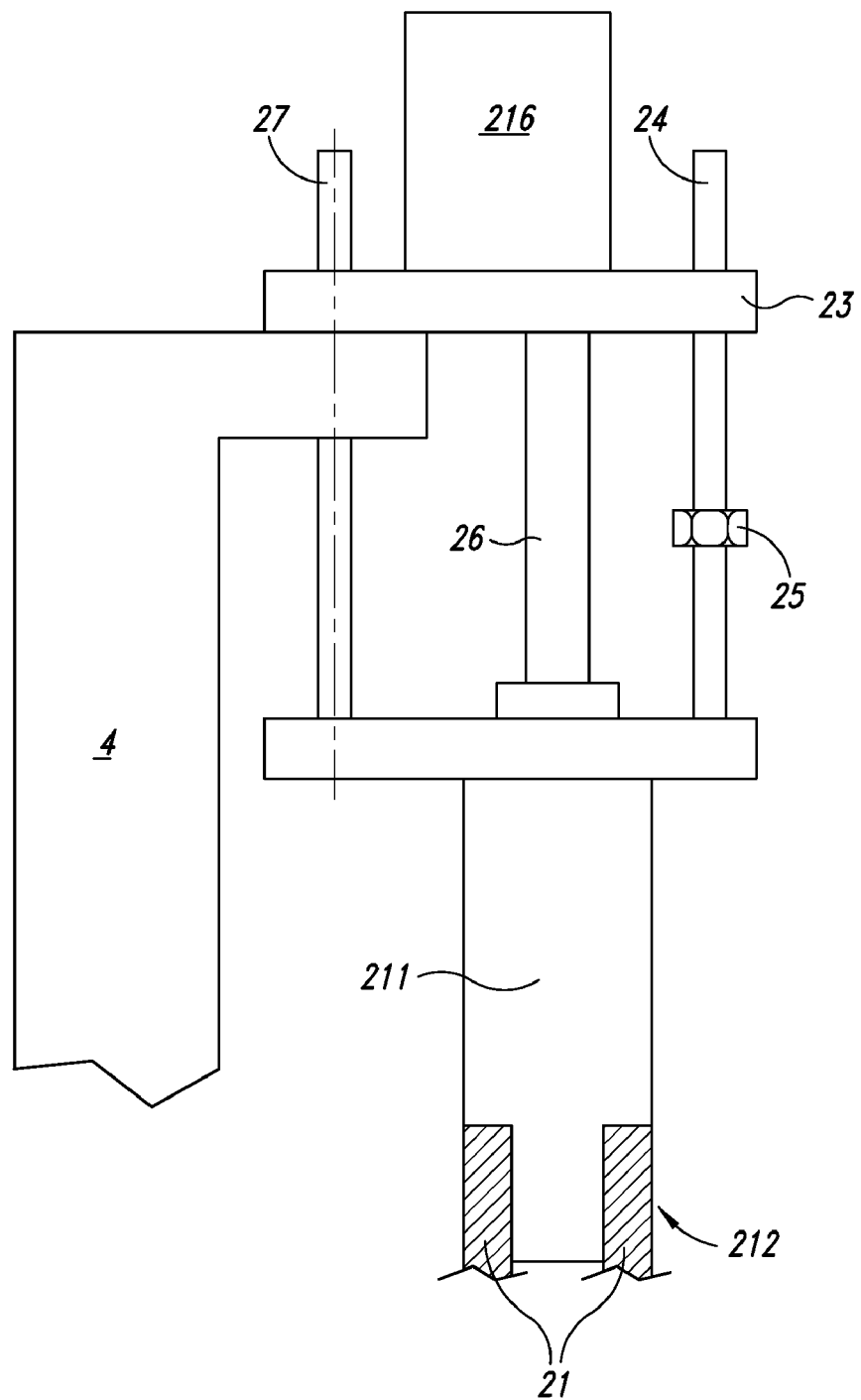
FIG. 11 shows a side elevation view of a further configuration of an inventive support pole, with a drive means.

In FIG. 11, to provide a better overview, only the upper portion of a support pole according to the invention is shown as far as the transition to the end member 212. Said Figure also includes part of foundation section 4. The latter is joined to the upper plate 23. Rod 26 can be in the form of a threaded rod that is rotatably mounted at its lower end and turned by a drive means 216 such that plate 23 can be vertically moved with a matching thread, depending on the direction of rotation. This also changes the vertical position of foundation segment 4 attached to the upper plate. The control systems for drive means such as electric motors, as well as the control systems for the cylinders 26, 29 shown in FIGS. 9 and 10 are well known, so they are not described her in further detail.

Figure 12:
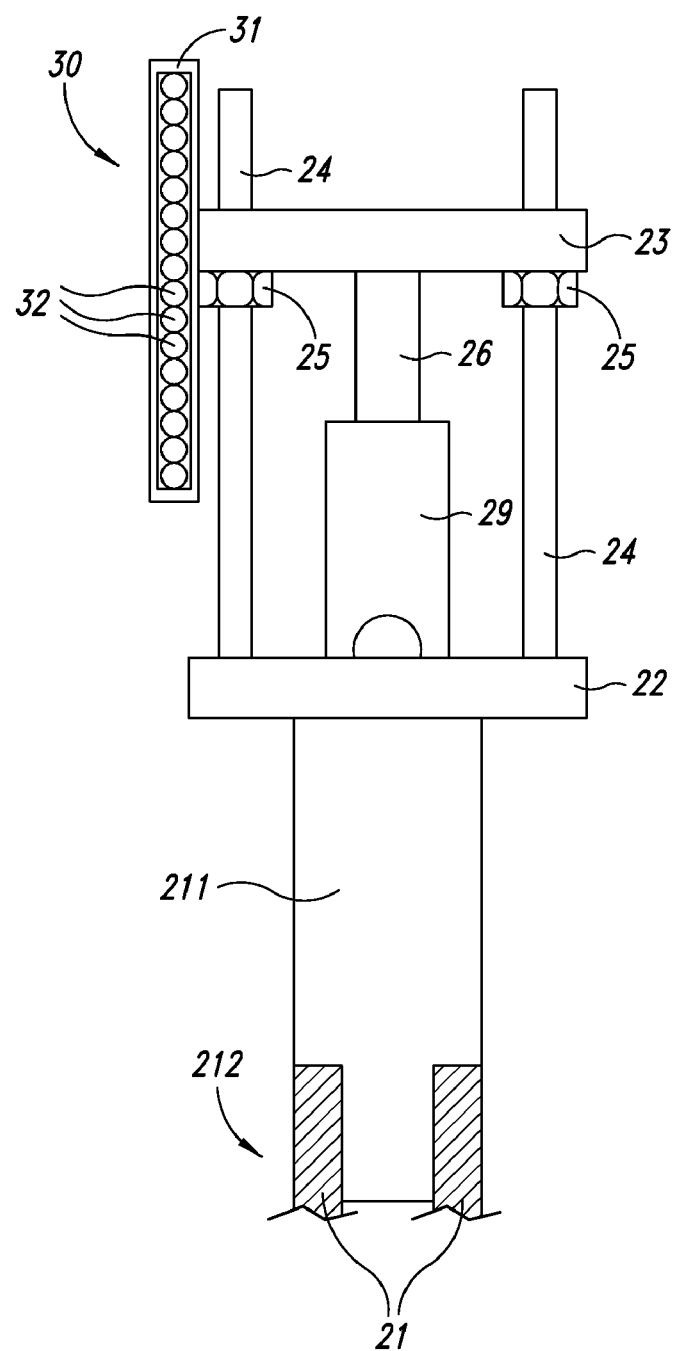
FIG. 12 shows a front view of a further configuration of an inventive support pole, with a sensor for vertical adjustment.

FIG. 12 shows a further embodiment of a support pole according to the invention that permits the supporting bracket to move automatically into a pre-definable position. The same Figure shows only the upper potion of the support pole according to the invention, again for a better overview. This structure is substantially the same as that of the variant shown in FIGS. 9 and 10.

However, a sensor 30 is provided here in addition to the elements shown in FIGS. 9 and 10. Said sensor comprises a plurality of light-sensitive elements 32 arranged in a housing 31, such as phototransistors, photoresistors or the like. Filters may also be provided, or the light-sensitive elements 32 can be configured in such a way that they respond only to a predefined spectral range in order to minimize or completely eliminate the influence of stray light and daylight.

Thus, if a light source is provided in a predefined horizontal position, the light from said light source will strike the light-sensitive elements 32 regardless of the alignment of said light source, on the one hand, and the adjusted position of the supporting bracket, on the other hand. If said light is now sufficiently focused, only some of the light-sensitive elements 32 are struck by the light. This makes it possible to derive the vertically adjusted position of the respective supporting bracket relative to the light source. Thus, if sensor 30 is in a clearly defined position and the light source is also in a clearly defined position, it is possible to derive a correcting variable, for example from the deviation of the incident beam of light from a from a predefined position in sensor 30, e.g., its centre, that can be used to change the vertical adjustment of the supporting bracket. In this way, it is possible for the foundation section to be automatically adjusted.

Figure 13:
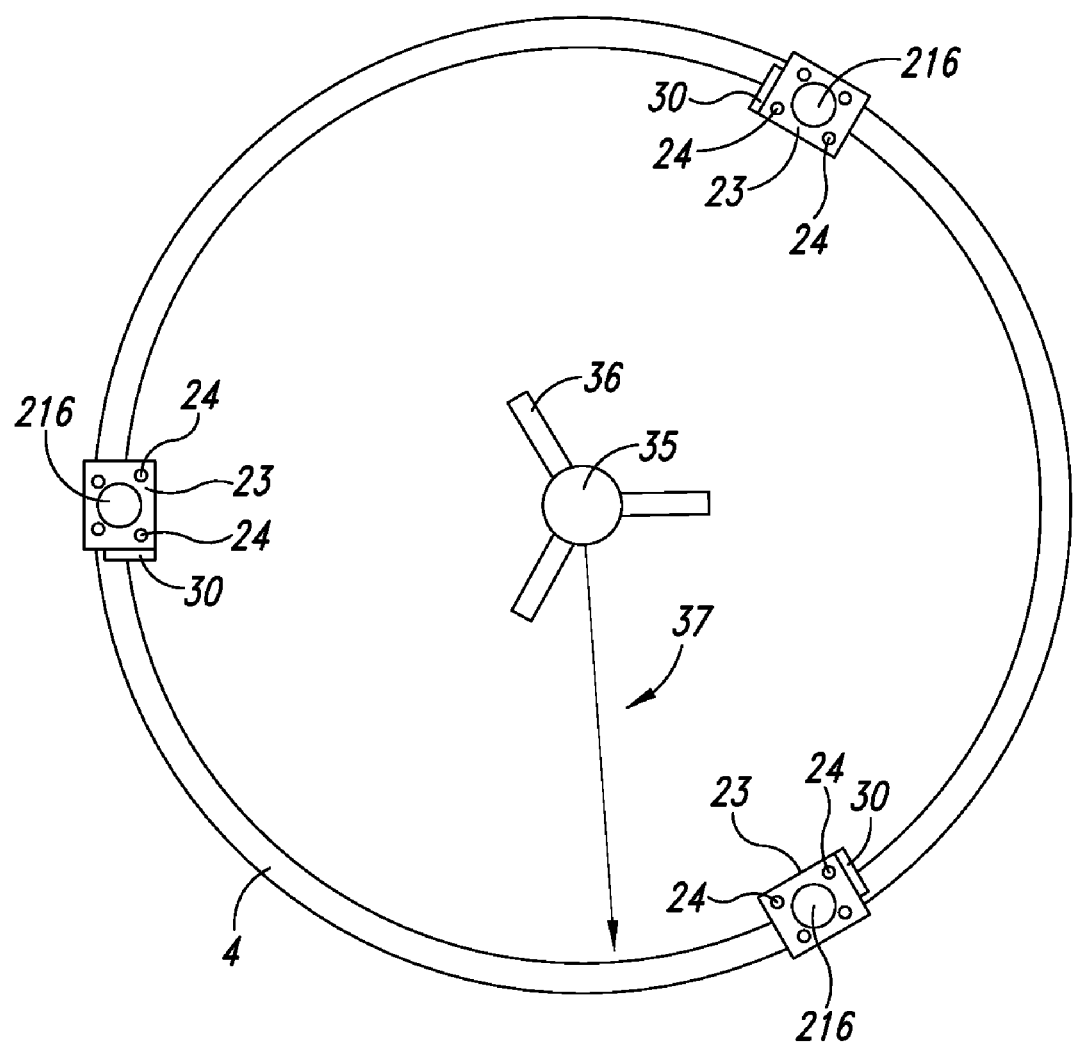
FIG. 13 shows a plan view of a foundation segment according to the invention, illustrating the generation of sensor signals for vertical adjustment.

An example of this arrangement is shown in FIG. 13. The latter shows a plan view of a foundation section 4, on the inner side of which three support poles according to the invention are arranged at 120° to each other. The important aspect of this arrangement is that the alignment of this foundation section is oriented to the upper flange, because said flange must be exactly horizontal in its alignment, whereas the alignment of the lower flange of the foundation section is irrelevant for easily understandable reasons. A light source 35 is installed in the centre of foundation section 4, for example on a tripod 36, and aligned so that it is perfectly horizontal. Said light source 35 can transmit a laser beam 37, for example, the light from which is still sufficiently bundled, even at a considerable distance, and which moves in a 360° circle inside the foundation section.

Each of the three supporting brackets is shown with its upper plate 23, which is fixedly attached to the foundation section 4. Also shown are the threaded rods 24, the drive means 216 and the sensor 30. If laser beam 37 now rotates with perfect horizontal alignment, a signal is generated at each sensor 30, said signal providing an indication as to whether the supporting bracket at that point is in the desired position, or must be adjusted by actuating the drive means 216, or manually adjusted.

In practice, vertical adjustment of the supporting brackets is preferably performed in such a way that one of the supporting brackets is first brought into a predefined position, that this supporting bracket is then left unchanged, and the alignment of foundation section 4 is then performed on the two other supporting brackets.

Sensor 30 can, of course, exercise a direct influence on drive means 216 with its output signal. On the other hand, a centralized control system can be provided that analyses the sensor signal and outputs corresponding signals for actuating the associated drive means 216.

Figure 14:
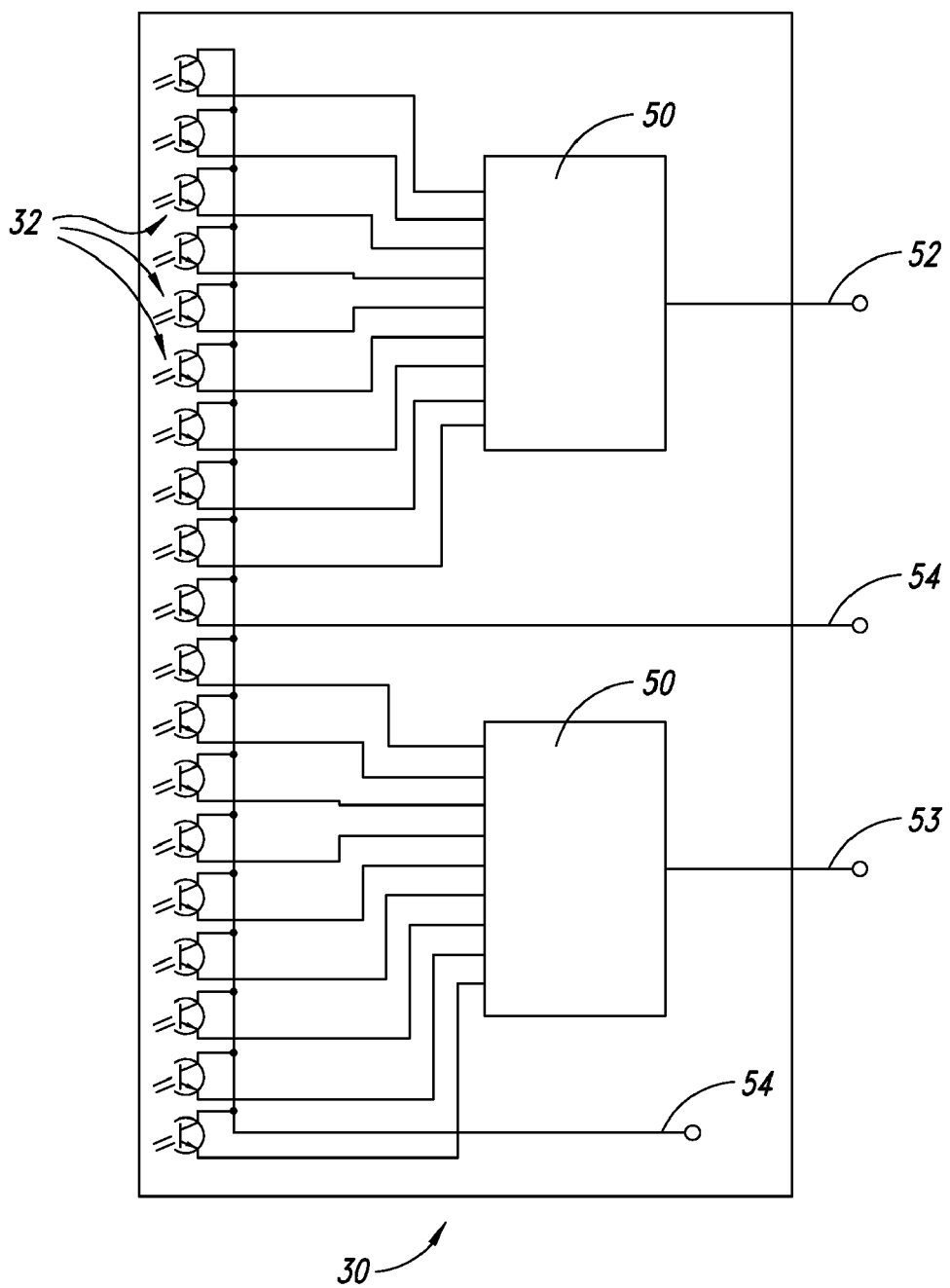
FIG. 14 shows a block diagram of a vertical adjustment sensor as provided in one configuration of the support poles.

FIG. 14 shows, in simplified form, an example of a sensor 30. In said sensor 30, light-sensitive sensor elements 32 are arranged beside and/or above each other. By way of illustration, these sensor elements are shown here as phototransistors. The external circuitry of the transistors has been left out for the sake of a better overview, but are common knowledge to the person skilled in the art. The collectors of these phototransistors 32 are connected in parallel to the power supply at a connector 51.

Depending on the position of the transistor in this sensor, the emitters of the transistors are connected to gates, or form a signal output. The emitters of the upper nine transistors shown in this Figure are connected to the input terminals of an OR-gate 50. The output from this gate 50 is available as an output signal 52. The emitters of the lower nine phototransistors shown in this figure are similarly connected to input terminals of an OR-gate, the output 53 from which is similarly available as an output signal. The output of the middle phototransistor is directly available as output signal 54. All outputs may also be conducted through amplifier stages, of course.

If sensor 30 is installed in such a way that the desired horizontal position is reached when the middle transistor is illuminated, it is easy to conclude from this that, whenever light shine on one of the phototransistors above this middle transistor, the sensor and hence the supporting bracket are positioned too low. Gate 50 causes a signal to appear at output 52 that triggers an upward adjustment of the supporting bracket and hence of the sensor. If the light falls on a phototransistor below the middle phototransistor, it can be concluded from this that the supporting bracket must be adjusted to a lower position. As soon as the middle phototransistor output a signal at terminal 54, this can be used as a "Stop" signal for terminating adjustment of the supporting bracket.

Since the absolute height, e.g., above mean sea level, is not strictly defined for the upper flange of the foundation section, there is an alternative procedure for aligning the foundation section that can also be considered. In this procedure, one of the supporting brackets is first set to a desired height. The rotating beam of light will therefore strike one of the light-sensitive elements 32. This sensor outputs a sensor signal that permits the light-sensitive element 32 struck by the rotating light beam to be inferred, and that therefore represents the adjusted height of the supporting bracket. Such a signal can be an analog signal, or a digital signal, e.g., a binary-coded signal. This signal can be fed to a central controller, for example. When the two supporting brackets still to be adjusted are moved until each of the assigned sensors outputs the same signal to the central controller, i.e., until the same sensor element is struck by the light beam, the foundation section has again been horizontally aligned.

Other configurations of the sensors and a different way of adjusting the supporting brackets are also possible, of course. For example, one configuration provides for a reflecting element that reflects an incident beam of light to be disposed at the same vertical position on each supporting bracket. Not only the light source but also a matching receiver is then disposed at the centre of the foundation section. Only when the light beam hits the reflector element is a reflected beam of light received by the receiver, thus signaling the correct vertical position.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention is not limited to use in wind turbines, but can essentially be applied in any kind of structure comprising at least two segments in order to make a stable foundation. The number, arrangement and specific configuration of the elements shown in the Figures, in particular the support poles, can be varied.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An apparatus, comprising:
a foundation member having an upper flange;
a supporting pole, the supporting pole including:
   a middle section,
   an end member removably coupled to the middle section and having a base plate, the end member being adapted to be at least partially covered by a foundation mass and to be permanently coupled to the foundation member and the middle section,
   a transition section having a threaded portion in the end member, and
   a supporting bracket coupled to the upper flange and to the middle section, the supporting bracket being removable from the end member after the end member is covered by the foundation mass;
an upper plate;
a lower plate;
a pair of threaded poles extending between the upper plate and the lower plate to provide adjustment of a relative position between the upper plate and the lower plate;
a rod coupled to the upper plate and positioned inside of the middle section; and
a telescopic cylinder positioned between the upper plate and the lower plate.

2. The apparatus of claim 1, wherein the telescopic cylinder is pneumatically or hydraulically operable to adjust a position of the foundation member.

3. The apparatus of claim 1, further comprising:
a height sensor coupled to the supporting pole, the sensor configured to send a signal indicative of a height.

4. The apparatus of claim 3 wherein the sensor is an optical sensor coupled to the supporting bracket.

5. An apparatus, comprising:
a foundation member having an upper flange;
a supporting pole, the supporting pole including
   a middle section,
   an end member removably coupled to the middle section and having a base plate, the end member being adapted to be at least partially covered by a foundation mass and to be permanently coupled to the foundation member and the middle section,
   a transition section having a threaded portion in the end member, and
   a supporting bracket coupled to the upper flange and to the middle section, the supporting bracket being removable from the end member after the end member is covered by the foundation mass;
an upper plate;
a lower plate;
a pair of threaded poles extending between the upper plate and the lower plate to provide adjustment of a relative position between the upper plate and the lower plate;
a rod coupled to the upper plate and positioned inside of the middle section; and
a telescoping assembly between the upper plate and the lower plate, the telescoping assembly including a telescopic cylinder that is movable with respect to the rod to adjust a distance between the upper plate and the lower plate.

6. The apparatus of claim 5, wherein the rod extends from an end of the telescopic cylinder to the upper plate.

7. The apparatus of claim 5, further comprising:
a height sensor coupled to the supporting pole, the sensor configured to send a signal indicative of a height.

8. The apparatus of claim 7 wherein the sensor is an optical sensor coupled to the supporting bracket.

* * * * *